United States Patent [19]

Grounds

[11] 4,343,443
[45] Aug. 10, 1982

[54] WIRING APPARATUS

[75] Inventor: Thomas M. Grounds, Wichita, Kans.

[73] Assignee: C & T Line Construction, Inc., Wichita, Kans.

[21] Appl. No.: 178,498

[22] Filed: Aug. 15, 1980

[51] Int. Cl.³ .................... B65H 75/40; B65H 59/16
[52] U.S. Cl. ............... 242/86.7; 242/155 BW; 242/157 R
[58] Field of Search ...... 242/155 BW, 155 R, 86.5 R, 242/86.7, 154, 157 R

[56] References Cited

U.S. PATENT DOCUMENTS

| | | | |
|---|---|---|---|
| 2,948,483 | 8/1960 | Petersen | 242/86.7 X |
| 2,999,655 | 9/1961 | Petersen et al. | 242/155 R |
| 3,054,572 | 9/1962 | Williams et al. | 242/86.7 |
| 3,073,574 | 1/1963 | Garnett | 242/86.5 R X |
| 3,203,640 | 8/1965 | Garnett | 242/86.7 |
| 3,317,149 | 5/1967 | Gooch | 242/155 R X |
| 3,325,119 | 6/1967 | Lehtio | 242/86.7 |
| 3,478,984 | 11/1969 | Landsem | 242/154 |

FOREIGN PATENT DOCUMENTS 703919  2/1954  United Kingdom ........ 242/155 BW

*Primary Examiner*—Stanley N. Gilreath
*Attorney, Agent, or Firm*—John H. Widdowson

[57] ABSTRACT

This invention relates to apparatus used to apply tension to heavy distribution wire or cable that is preferably made of rolling two cables in a wrapped form and is used when pulling the wire onto existing structures, and the method of accomplishing such with the apparatus. The apparatus has a frame with a pair of wheels; a guide for guiding the wire; lower and upper bull wheels; a brake connects to the frame and operatively communicates with the lower and upper bull wheels to maintain tension on the wire; and an adjustable tension swagger roller attached to the frame and positioned between the guide and the lower bull wheels.

9 Claims, 7 Drawing Figures

WIRING APPARATUS

BACKGROUND OF THE INVENTION

1. Field of the Invention

This invention relates to a wire tensioning apparatus and method. More specifically, this invention provides for a trailer for tensioning wrapped conductor electrical distribution cable, and to a method for such tensioning.

2. Description of the Prior Art

U.S. Pat. No. 3,325,119 by Lehtis discloses a reel carrier having tensioning means thereon. U.S. Pat. No. 3,054,572 by Williams et al discloses a trailer vehicle for carrying a reel of wire which is to be dispensed from the vehicle through a pair of bull wheels that have tension regulating means associated therewith. The rotation of the cable carrying support means has a brake associated therewith so that the rotation of the cable spool or reel can be regulated so as not to allow too free a removal of cable from the reel so as to allow slipping of the cable in the bull wheels. U.S. Pat. Nos. 3,073,574 and 3,203,640, both to Garrett, disclose an arrangement means for dispensing cable from a trailer-like vehicle whereby tension means are provided to regulate the dispensing of the cable from the reels upon which the same are carried. None of the foregoing prior art teaches the particular wire tensioning apparatus of this invention.

SUMMARY OF THE INVENTION

It is therefore an object of this invention to provide a wire tensioning apparatus and method.

It is another object of this invention to provide a trailer for tensioning wrapped electrical distribution cable to prevent the cable from being unwrapped upon installation.

The foregoing objects are achieved according to the practice of this invention. Broadly, this invention is an apparatus and method for tensioning electrical cable as it is installed without damaging it. The apparatus comprises a frame, a pair of wheels supporting the frame and rotatable thereon; and guide means connected to the frame for guiding the electrical cable as it leaves the reel. Lower and upper bull wheels rotatably attach to the frame and are positioned such as to have the electrical cable traverse an essentially S-shaped course with respect to a vertical plane as the cable passes over and around the lower and upper bull wheels. Brake means, preferably hydraulic disk, is connected to the frame and operatively communicates with the lower and upper bull wheels to maintain tension of the cable as it traverses the S-shaped course. An adjustable tension swagger roller means attaches to the frame and is positioned between the guide means and the lower bull wheel.

Still other objects and further novel features of the present invention will become more fully apparent from the appended claims and as the ensuing detailed description and discussion proceeds in conjunction with the accompanying drawings in which:

DETAILED DESCRIPTION OF THE INVENTION

Figure 1:
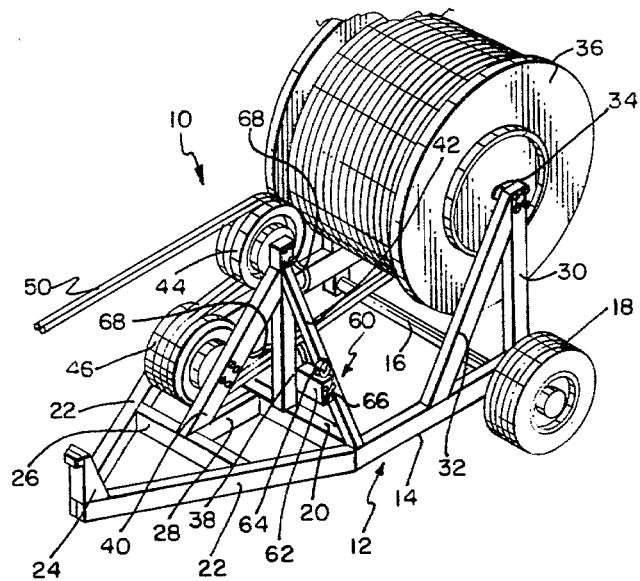
FIG. 1 is a perspective view of the invention.

Referring in detail now to the drawings, wherein similar parts of the invention are identified by like reference numerals, there is seen a trailer apparatus, generally illustrated as 10, for tensioning electrical conductor or cable, having a frame, generally illustrated as 12, including a pair of side bars 14, 14, a wheel shaft 16 connecting across the side bars 14, 14 and including a pair of wheels 18, 18 rotatably attaching to the ends thereof to support the frame 12. A first cross bar 20 connects across to both side bars 14, 14 which both have convergent forward portions 22, 22 that rigidly join to define a hitch 24. A second cross bar 26 connects to the convergent forward portions 22, 22 of the side bars 14, 14 and a cross bar interconnecting member 28 attaches to the first cross bar 20 and to the second cross bar 26. A reel post member 30 is mounted on each side of the rear of the frame 12 and a reel strut bar 32 interconnects the reel post members 30, 30 and the side bars 14, 14 on both sides of the frame 12. The post members 30, 30 and the strut bars 32, 32 define substantially triangular frames with respect to their associated side bars 14, 14. A shaft 34 rotatably lodges between and at the top of the post members 30, 30, whereupon an electrical cable reel 36 rotatably rests. A central post member 38 is mounted on the first cross bar 20, and a central strut bar 40 connects from the top of the central post member 38 to the connecting point of the second cross bar 26 and the cross bar interconnecting member 28. A third strut bar 42 attaches to the top of the central post member 38 to the connecting point of the first cross bar 20 and the side bar 14 such as to generally define a triangular frame with respect to the first cross bar 20.

Figure 2:
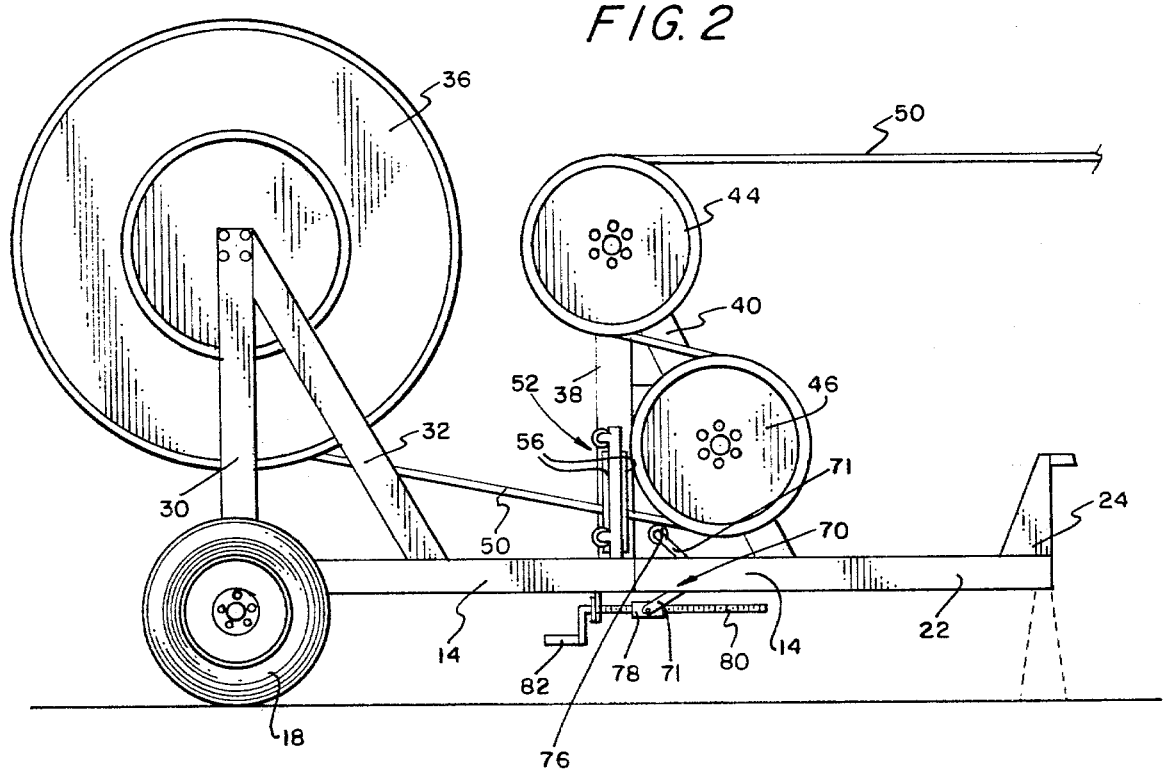
FIG. 2 is a side elevational view of the wire or cable tensioning apparatus.
Figure 5:
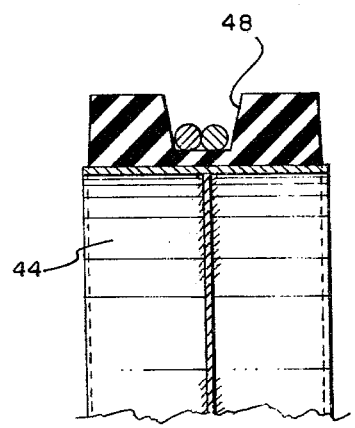
FIG. 5 is a partial vertical view taken along the plane of line 5—5 in FIG. 3.

An upper bull wheel 44 rotatably attaches to the central post member 38 and a lower bull wheel 46 rotatably attaches to the central strut bar 40. The lower bull wheel 46 and the upper bull wheel 44 include a structure defining a groove 48 (see FIG. 5) along the circumferential perimeter thereof. The upper and lower wheels 44, 46 are positioned such as to have an electrical cable 50 traverse an essentially S-shaped course with respect to a vertical plane (see FIG. 2) as the cable 50 passes over and around the lower 46 and upper 44 wheels.

A guide means, generally illustrated as 52, connects to post member 38 for guiding the electrical cable 50 as it leaves the reel 36. The guide means 52 is essentially square shaped, having a structure defining a generally square opening 54, and includes a pair of vertical guide swagging rollers 56, 56 and a pair of horizontal guide swagging rollers 58, 58 both pairs being situated along the perimeter of the generally square opening 54.

Figure 3:
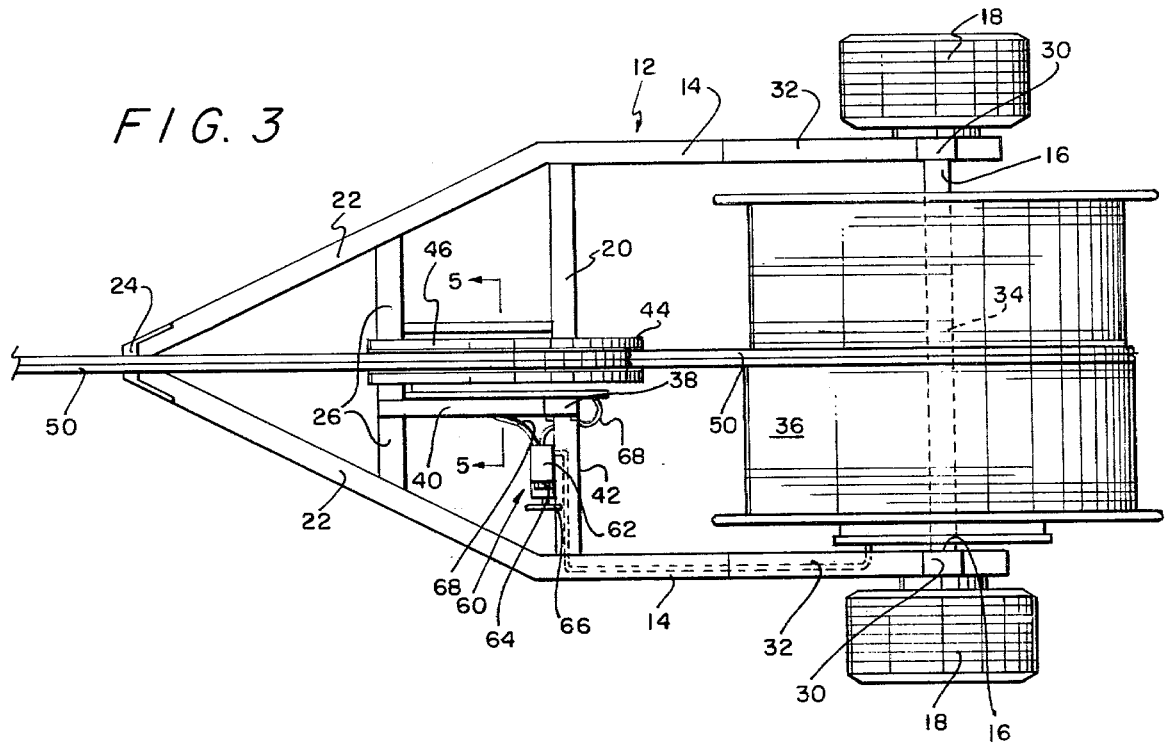
FIG. 3 is a top plan view of the invention.
Figure 4:
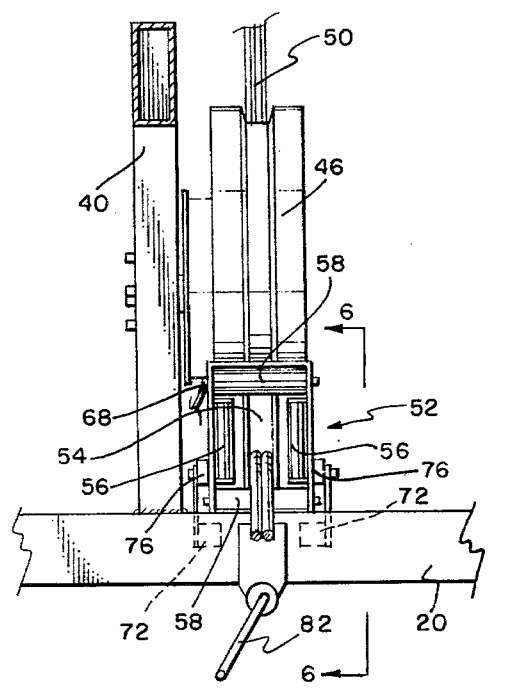
FIG. 4 is a partial, enlarged front elevational view disclosing the guide means, the lower bull wheel and the adjustable tension swagger roller.

A hydraulic adjustable, regulatable disc brake means, generally illustrated as 60 (see FIGS. 1 and 3) connects to strut bar 42 and includes a fluid reservoir box 62 having gauge 64 and central handle 66, and operatively communicates via hydraulic lines 68 to a disc (not shown in the drawings) in the upper 44 and lower 46 bull wheels to maintain and regulate tension on the cable 50 as it traverses the S-shaped course.

Figure 6:
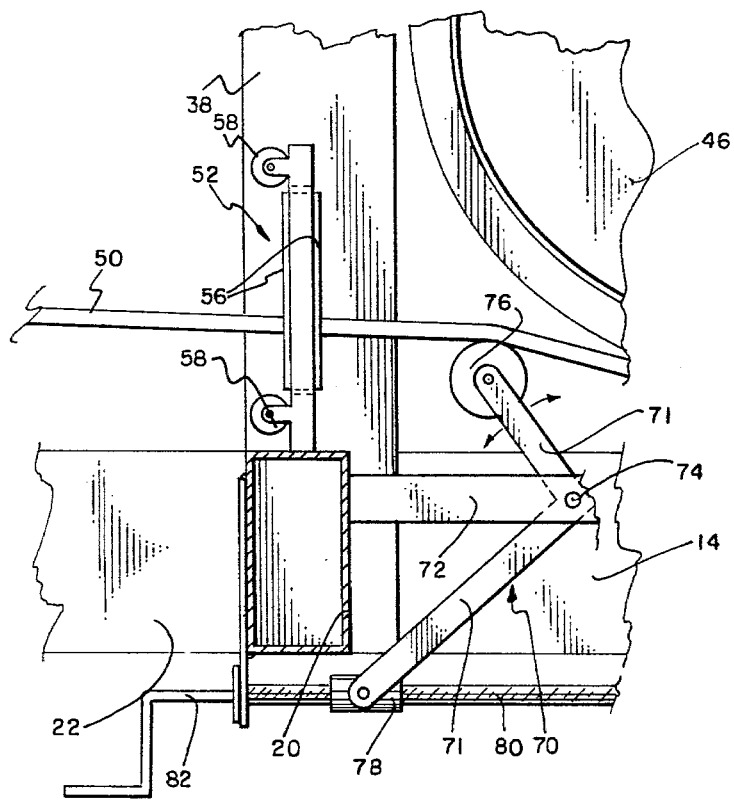
FIG. 6 is a partial, exploded side elevational view taken along the plane of line 6—6 in FIG. 4.
Figure 7:
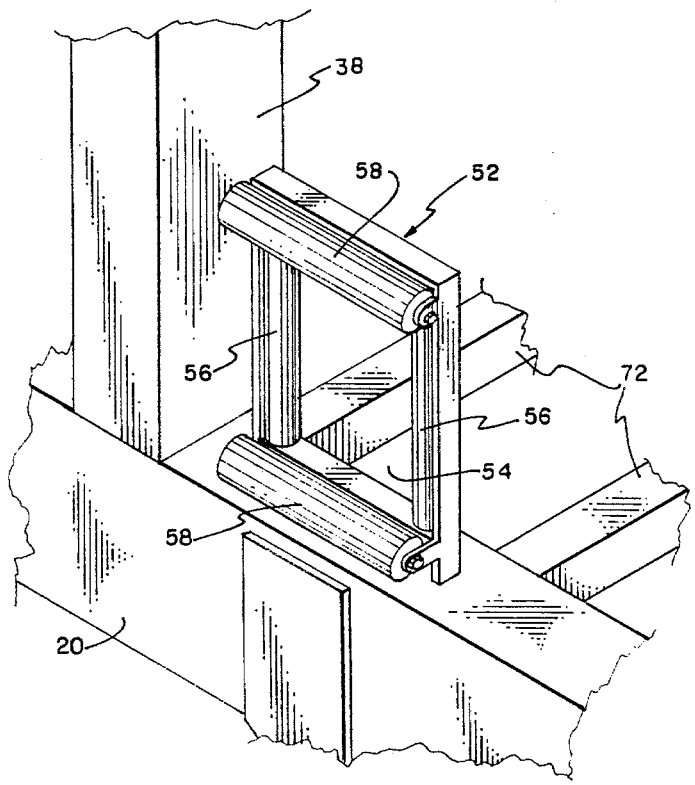
FIG. 7 is an enlarged perspective view of the electrical conductor guide means.

An adjustable tension swagger roller means, generally illustrated as 70, is attached to a pair of beams 72, 72 (see FIGS. 6 and 7) which connect at one end to cross bar 20 while the other ends of beams 72, 72 are unconnected. Swagger roller means 70 is positioned between the guide means 52 and the lower bull wheel 46 and comprises an L-shaped bracket 71 pivotally attaching to a shaft 74 (see FIG. 6) which interconnects beams 72, 72. A tension roller 76 rotatably connects to one end of L-shaped bracket 71 for engaging the electrical conductor 50 to prevent swagging. A threaded conduit 78 pivotally attaches to the other end of the bracket 71. A threaded shaft 80, bound to a hand crank 82, threadably engages the threaded conduit 78 such that a predetermined directional rotation of the hand crank 82 causes the threaded conduit 78 to move in a predetermined direction along the threaded shaft 80 which in turn causes the roller 76 on bracket 71 to rise or fall, depending upon the predetermined directional rotation of the hand crank 82.

With continuing reference to the drawings for operation of the invention, hitch 24 is attached to a truck for hauling the trailer apparatus 10 to the site of the laying of the conduit or cable 50 which normally is wrapped conductor electrical distribution cable having the current conducting wires therein, and my invention is especially valuable in laying as shown a pair of such side by side without damage from crimping or kinking. This is very advantageous when laying the usual fragile conductor or cable having thin alumninum sheathing. A support (dotted lines in FIG. 2) is positioned to support the hitch end of the trailer 10. The rear end of the trailer 10 is anchored by any well known means, and another truck or tractor is used to pull the conductor 50 from the reel 36 through the guide means 52, over the adjustable tensioning swagging roller means 70, over and around the lower 46 and upper 44 grooved bull wheels. The hydraulic brake disc means 60 is adjusted to maintain tension on 50. The adjustable tensioning swagging roller means 70 adjusts the amount of swagging.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. An apparatus for installing under tension electrical conductor or cable comprising:
    a frame;
    wheels supporting said frame and rotatable thereon;
    an electrical cable or conductor reel rotatably attached to said frame;
    guide means connected to said frame for guiding said electrical conductor or cable as it leaves said reel;
    a lower and upper bull wheel, both rotatably attached to said frame and positioned such as to have said electrical conductor or cable traverse an essentially S-shaped course with respect to a vertical plane as same passes over and around said lower and upper wheels;
    brake means connected to said frame and operatively communicating with said lower and upper bull wheel to maintain tension on said conductor or cable as it traverses said S-shaped course;
    an adjustable tension swagger roller means attached to said frame and positioned between said guide means and said lower bull wheel;
    said adjustable tension swagger roller means comprises an L-shaped bracket pivotally attached to said frame including a tension roller rotatably connected to one end thereof for engaging said electrical conductor or cable to prevent swagging;
    a threaded conduit pivotally attached to the other end of said bracket;
    a threaded shaft bound to a hand crank and threadably engaging said threaded conduit such that a predetermined directional rotation of the hand crank causes the threaded conduit to move in a predetermined direction along said threaded shaft which in turn causes the roller end of said L-shaped bracket to rise or fall depending upon the predetermined directional rotation of said hand crank.

2. The apparatus of claim 1 wherein said guide means is essentially square shaped including a structure defining a generally square opening, said guide means additionally including a pair of vertical guide swagging rollers and a pair of horizontal guide swagging rollers, both pairs being situated along the perimeter of said generally square opening.

3. The apparatus of claim 2 wherein said lower and upper bull wheels include a structure defining a groove along the circumferential perimeter thereof.

4. The apparatus of claim 3 additionally comprising a reel post member mounted on each side of said frame, a reel strut bar interconnecting said reel post member and said frame on both sides of said frame, a shaft rotatably lodging between the pair of post members, said reel being bound to said shaft for rotation.

5. The apparatus of claim 4 wherein said frame includes a pair of side bars;
    a wheel shaft connecting across said side bars and rotatably attaching said wheels;
    a first cross bar attaching across said side bars;
    said side bars having convergent forward portions which rigidly join to define a hitch;
    a second cross bar connecting to the convergent forward portions of said side bars; and
    a cross bar interconnecting member attaching to said first and said second cross bars.

6. The apparatus of claim 5 wherein said post members and said strut bars define substantially triangular frames with respect to their associated side bars.

7. The apparatus of claim 6 additionally including a central post member mounted on said first cross bar;
    a central strut bar connecting from the top of said central post member to the connecting point of said second cross bar and said cross bar interconnecting member;
    a third strut bar attaching from the top of said central post member to the connecting point of said first cross bar and a side bar such as to generally define a triangular frame with respect to said first cross bar.

8. The apparatus of claim 7 wherein said upper bull wheel is rotatably attached to said central post member, and said lower bull wheel rotatably attaches to said central strut bar.

9. The apparatus of claim 8 wherein said brake means is hydraulic disc and includes a control box attached to said third strut bar.

* * * * *